(12) United States Patent
Park et al.

(10) Patent No.: US 10,063,825 B2
(45) Date of Patent: Aug. 28, 2018

(54) METHOD OF OPERATING MOBILE DEVICE AND MOBILE SYSTEM

(71) Applicant: SAMSUNG ELECTRONICS CO., LTD., Suwon-si (KR)

(72) Inventors: Moo-Youn Park, Seongnam-si (KR); Jin-Ha Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 15/162,970

(22) Filed: May 24, 2016

(65) Prior Publication Data

US 2017/0070716 A1    Mar. 9, 2017

(30) Foreign Application Priority Data

Sep. 7, 2015   (KR) .......................... 10-2015-0126342

(51) Int. Cl.
| | | |
|---|---|---|
| *H04N 9/73* | (2006.01) | |
| *H04N 5/225* | (2006.01) | |
| *H04N 5/232* | (2006.01) | |

(52) U.S. Cl.
CPC ........... *H04N 9/735* (2013.01); *H04N 5/2256* (2013.01); *H04N 5/2257* (2013.01); *H04N 5/23203* (2013.01); *H04N 5/23293* (2013.01); *H04M 2250/52* (2013.01)

(58) Field of Classification Search
None
See application file for complete search history.

(56) References Cited

U.S. PATENT DOCUMENTS

| | | | |
|---|---|---|---|
| 4,881,127 A | 11/1989 | Isoguchi et al. | |
| 5,262,815 A | 11/1993 | Aumiller | |
| 5,726,672 A | 3/1998 | Hernandez et al. | |
| 6,507,286 B2 | 1/2003 | Weindorf et al. | |
| 7,663,691 B2 | 2/2010 | Ciudad et al. | |
| 8,085,318 B2 | 12/2011 | Ciudad et al. | |
| 8,199,249 B2 | 6/2012 | Ciudad et al. | |
| 8,537,248 B2 | 9/2013 | Ciudad et al. | |
| 8,797,441 B2 * | 8/2014 | Patel .................. | H04N 5/20 348/333.01 |
| 8,970,776 B2 | 3/2015 | Ciudad et al. | |
| 9,635,255 B1 * | 4/2017 | Baldwin ............ | H04N 5/23241 |
| 2004/0032497 A1 | 2/2004 | Ying et al. | |

(Continued)

FOREIGN PATENT DOCUMENTS

| | | |
|---|---|---|
| CN | 101996583 A | 3/2011 |
| CN | 102346644 A | 2/2012 |

(Continued)

*Primary Examiner* — James Hannett
(74) *Attorney, Agent, or Firm* — Sughrue Mion, PLLC

(57) ABSTRACT

A method of operating a mobile device and mobile systems are provided. The method includes detecting a first event through an interface of the mobile device, displaying scene data that is generated by a camera of the mobile device on a display of the mobile device, in response to the detecting first event, detecting a second event through the interface, and measuring an external color temperature in response to the detecting the second event. The method further includes generating flash data having a color temperature for compensating the external color temperature, displaying the flash data on the display, and capturing a scene using the camera.

17 Claims, 14 Drawing Sheets

(56) References Cited

U.S. PATENT DOCUMENTS

| | | |
|---|---|---|
| 2006/0018653 A1 | 1/2006 | Kido |
| 2006/0284895 A1 | 12/2006 | Marcu et al. |
| 2009/0273661 A1* | 11/2009 | Mauchly ............... H04N 5/2256 348/14.08 |
| 2009/0322889 A1* | 12/2009 | Kujawa ................ H04N 5/2354 348/207.99 |
| 2015/0181101 A1 | 6/2015 | Ciudad et al. |
| 2015/0189138 A1* | 7/2015 | Xie ...................... H04N 5/2256 348/222.1 |
| 2016/0360102 A1* | 12/2016 | Ciudad ................ H04N 5/2354 |

FOREIGN PATENT DOCUMENTS

| | | |
|---|---|---|
| EP | 1 775 939 A2 | 4/2007 |
| KR | 10-2005-0075625 A | 7/2005 |

\* cited by examiner

1200

1300

METHOD OF OPERATING MOBILE DEVICE AND MOBILE SYSTEM

CROSS-REFERENCE TO RELATED APPLICATION

This application claims priority from Korean Patent Application No. 10-2015-0126342, filed on Sep. 7, 2015 in the Korean Intellectual Property Office, the disclosure of which is incorporated herein by reference in its entirety.

BACKGROUND

1. Field

Methods and apparatuses consistent with example embodiments relate to a method of operating a mobile device and a mobile system.

2. Description of the Related Art

Mobiles devices such as smartphones may have a camera (e.g., a front camera) on the principal surface thereof. A user can capture an image while viewing the image to be captured using a camera device facing in the same direction as a display device. To capture a subject using this camera device especially in a dark environment, a light source may be used to illuminate the subject.

SUMMARY

Example embodiments provide a method of operating a mobile device using a display as a flash light source instead of having a flash device.

Example embodiments also provide a mobile system using a display as a flash light source instead of having a flash device.

According to an aspect of an example embodiment, there is provided a method of operating a mobile device, the method including detecting a first event through an interface of the mobile device, displaying scene data that is generated by a camera of the mobile device on a display of the mobile device, in response to the detecting first event, detecting a second event through the interface, and measuring an external color temperature in response to the detecting the second event. The method further includes generating flash data having a color temperature for compensating the external color temperature, displaying the flash data on the display, and capturing a scene using the camera.

The displaying the scene data and the displaying the flash data may be performed in a time division manner.

The displaying the scene data may include displaying the scene data on the display at a first time before the detecting the second event, and the displaying the flash data may include displaying the flash data on the display at a second time after the detecting second event.

The measuring may include analyzing the scene data in response to the detecting the second event, and measuring the external color temperature based on the analyzed scene data.

The measuring may include measuring the external color temperature in response to the detecting the second event, using a light sensor electrically connected to the camera.

The generating may include generating the flash data having the color temperature for compensating the external color temperature based on color temperature information that is measured by the light sensor.

The generating may include, in response to the external color temperature being warm, generating the flash data having the color temperature that is cool.

The generating may include, in response to the external color temperature being cool, generating the flash data having the color temperature that is warm.

A color of the flash data may be one among colors that are set before the detecting the first event.

The first event and the second event may be generated by a control application of the camera and received through the interface.

The scene data and the flash data may be displayed on the display by a control application of the display at respective times at which the first event and the second event are respectively generated.

The method may further include displaying the captured scene on the display.

The display may include a liquid crystal display or an organic light-emitting diode display.

The camera may include a dual lens, and the measuring may include measuring a color temperature of scene data that is obtained using the dual lens.

A computer-readable storage medium may store a program including instructions configured to cause a computer to perform the method.

According to an aspect of another example embodiment, there is provided a method of operating a mobile device, the method including detecting a first event through an interface of the mobile device, displaying scene data that is generated by a camera of the mobile device on a display of the mobile device, in response to the detecting the first event, and detecting a second event through the interface. The method further includes generating flash data in response to the detecting the second event, displaying the scene data simultaneously with the flash data on the display, and capturing a scene using the camera.

The displaying the scene data simultaneously with the flash data may be performed in a spatial division manner.

The displaying the scene data simultaneously with the flash data may include displaying the scene data on a first area of the display, and displaying the flash data on a second area of the display, the second area being different from the first area.

The displaying the scene data in response to the detecting first event may include displaying the scene data on a first area and a second area of the display before the detecting the second event.

The method may further include displaying the captured scene on a first area and a second area of the display.

The method may further include measuring an external color temperature, and the generating may include generating the flash data having a color temperature for compensating the external color temperature.

According to an aspect of example embodiments, there is provided a method of operating a mobile device, the method including detecting a first event through an interface of the mobile device, and displaying scene data that is generated by a camera of the mobile device on a first area of a display of the mobile device, and displaying flash data on a second area of the display, the second area being different from the first area, in response to the detecting the first event. The method further includes detecting a second event through the interface, and capturing a scene using the camera, in response to the detecting the second event.

The displaying the scene data and the displaying the flash data may be performed in a spatial division manner.

The method may further include displaying the captured scene on the first area.

The method may further include measuring an external color temperature, and generating the flash data having a color temperature for compensating the external color temperature.

The capturing may include capturing a video using the camera.

The capturing may include making a video call using the camera.

According to an aspect of another example embodiment, there is provided a mobile system including a display, a camera, and a processor configured to detect a first event through an interface, control the display to display scene data that is generated by the camera, in response to the processor detecting the first event, detect a second event through the interface, and measure an external color temperature in response to the processor detecting the second event. The processor is further configured to generate flash data having a color temperature for compensating the external color temperature, control the display to display the flash data, and capture a scene using the camera.

The processor may be further configured to control the display to display the scene data and the flash data in a time division manner or a spatial division manner using a timer.

The processor may be further configured to control the display to display the scene data at a first time before the processor detects the second event, and display the flash data at a second time after the processor detects the second event.

The processor may be further configured to control the display to display the scene data at a first time before the processor detects the second event, and display the scene data simultaneously with the flash data at a second time after the processor detects the second event.

The processor may be further configured to control the display to display the scene data on a first area of the display, and display the flash data on a second area of the display, the second area being different from the first area, at the second time.

The mobile system may further include a light sensor electrically connected to the camera, the light sensor being configured to measure the external color temperature.

The mobile system may further include a frame buffer configured store the scene data and the flash data before the scene data and the flash data are displayed on the display.

The processor may be further configured to control the display to display the captured scene.

The mobile system may further include a storage device configured to store the captured scene as an image file or a video file.

According to an aspect of another example embodiment, there is provided a mobile device including a display, a camera, and a processor configured to receive a first instruction for operating the camera, control the display to display scene data that is generated by the camera, in response to the processor receiving the first instruction, and receive a second instruction for controlling the camera to photograph a scene. The processor is further configured to generate flash data having a color temperature for compensating an external color temperature, and control the display to display flash data, in response to the processor receiving the second instruction, and capture the scene using the camera, in response to the display displaying the flash data.

The processor may be further configured to control the display to display the scene data in a first area of the display simultaneously with the flash data in a second area of the display in response to the processor receiving the second instruction.

The processor may be further configured to control the display to display the scene data in a first area of the display simultaneously with the flash data in a second area of the display in response to the processor receiving the first instruction.

The processor may be further configured to control the display to display the captured scene in a first area of the display simultaneously with the flash data in a second area of the display.

BRIEF DESCRIPTION OF THE DRAWINGS

The above and/or other aspects will be more apparent by describing example embodiments with reference to the accompanying drawings, in which.

DETAILED DESCRIPTION

Figure 1:
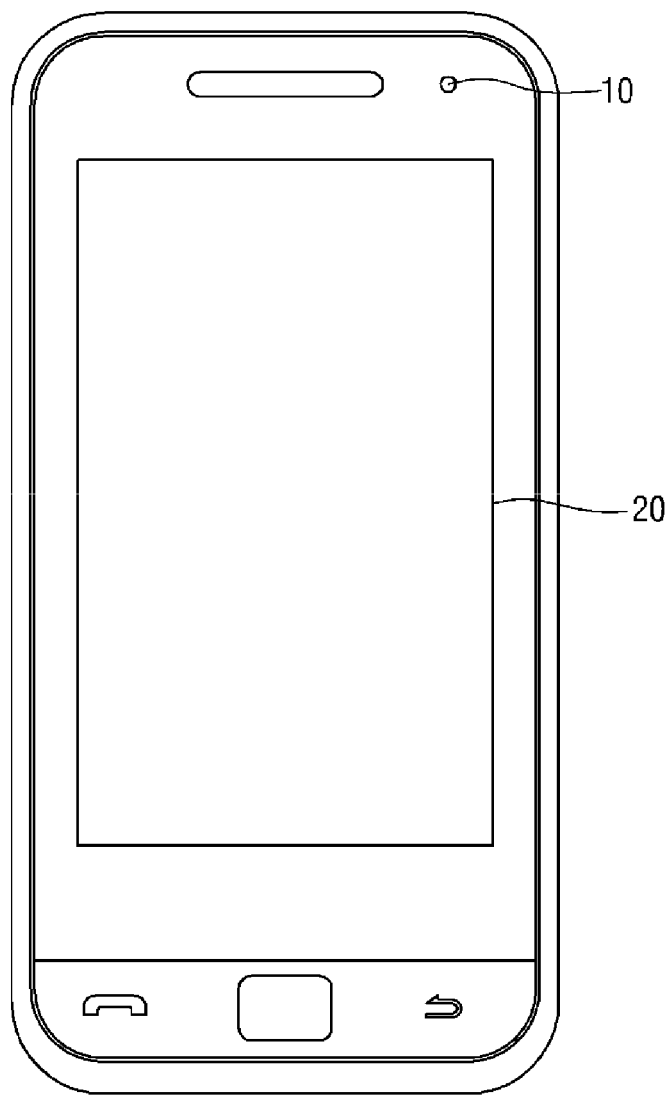
FIG. 1 is a schematic diagram of a mobile device according to an example embodiment.

Features of example embodiments and methods of accomplishing the same may be understood more readily by reference to the following detailed description of the example embodiments and the accompanying drawings. The example embodiments may, however, be embodied in many different forms and may not be construed as being limited to the example embodiments set forth herein. Rather, these example embodiments are provided so that this disclosure will be thorough and complete and will fully convey the concept of the disclosure to those skilled in the art, and the example embodiments will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements may not be limited by these terms. These terms are only used to distinguish one element from another element. Thus, for example, a first element, a first component or a first section discussed below could be termed a second element, a second component or a second section without departing from the teachings of the example embodiments.

The example embodiments will be described with reference to perspective views, cross-sectional views, and/or plan views. Thus, the profile of a view may be modified according to manufacturing techniques and/or allowances. That is, the example embodiments are not intended to limit the scope of the example embodiments but cover all changes and modifications that can be caused due to a change in manufacturing process. Thus, regions shown in the drawings are illustrated in schematic form and the shapes of the regions are presented by way of illustration and not as a limitation.

Unless defined otherwise, all technical and scientific terms used herein have the same meaning as commonly understood by one of ordinary skill in the art to which this disclosure belongs. It is noted that the use of any and all examples, or terms provided herein is intended to better illuminate the disclosure and is not a limitation on the scope of the disclosure unless otherwise specified. Further, unless defined otherwise, all terms defined in dictionaries may not be overly interpreted.

Figure 2:
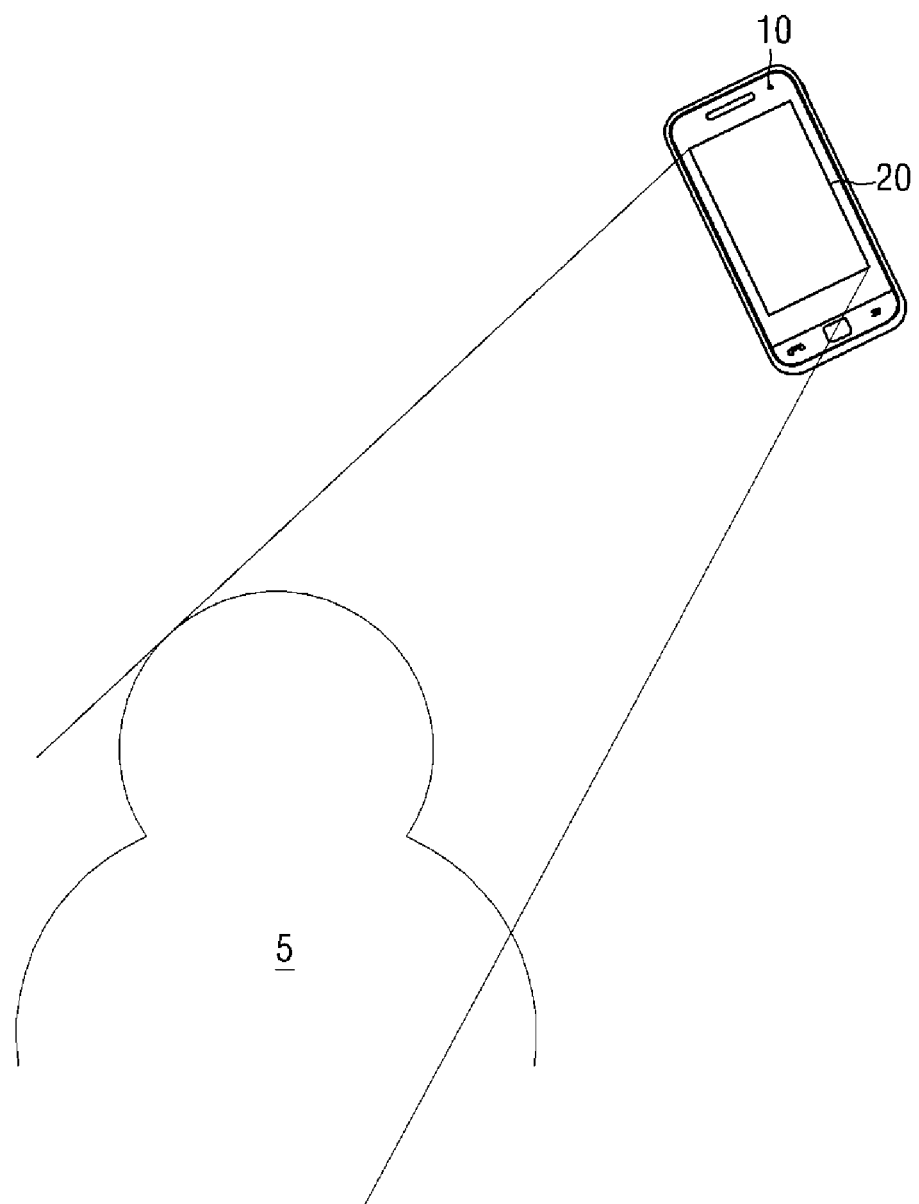
FIG. 2 is a schematic diagram illustrating operation of the mobile device of FIG. 1.

FIG. 1 is a schematic diagram of a mobile device 1 according to an example embodiment. FIG. 2 is a schematic diagram illustrating an operation of the mobile device 1 of FIG. 1.

Referring to FIG. 1, the mobile device 1 according to the example embodiment includes a camera 10 and a display 20.

The camera 10 may be located on a front surface of the mobile device 1 on which the display 20 is installed. The camera 10 may not have a flash device, for example, a flash light source implemented using a light-emitting diode (LED) on a front surface thereof.

To capture a subject (or a scene) in a dark environment, the camera 10 may not use a flash light source. Instead, the camera 10 may use the display 20 as a light source.

Referring also to FIG. 2, the brightness of a subject 5 to be captured by the camera 10 located on the front surface of the display 1 can be increased by light radiated from the display 20. Accordingly, when a shutter speed is not secured due to the dark environment, the subject 5 can secure the shutter speed using the display 20 instead of a flash light source.

Accordingly, because the mobile device 1 according to example embodiments does not need a flash light source, costs can be reduced. Further, because a control algorithm for using the display 20 as a light source can be implemented relatively simply, the complexity of implementation can also be reduced.

However, example embodiments are not limited to a case in which the camera 10 does not include a flash light source. In example embodiments, the camera 10 may include a flash light source in the vicinity of a lens.

In example embodiments, the mobile device 1 may include, but is not limited to, a smartphone, a cellular phone or a tablet computer, a personal computer, a notebook computer, a media player, a personal digital assistant (PDA), an embedded device, a consumer electronic device, etc.

In example embodiments, the display 20 may include, but is not limited to, a liquid crystal display (LCD) or an organic light-emitting diode (OLED) display. In example embodiments, the mobile device 1 may additionally include one or more cameras on a rear surface thereof.

Figure 3:
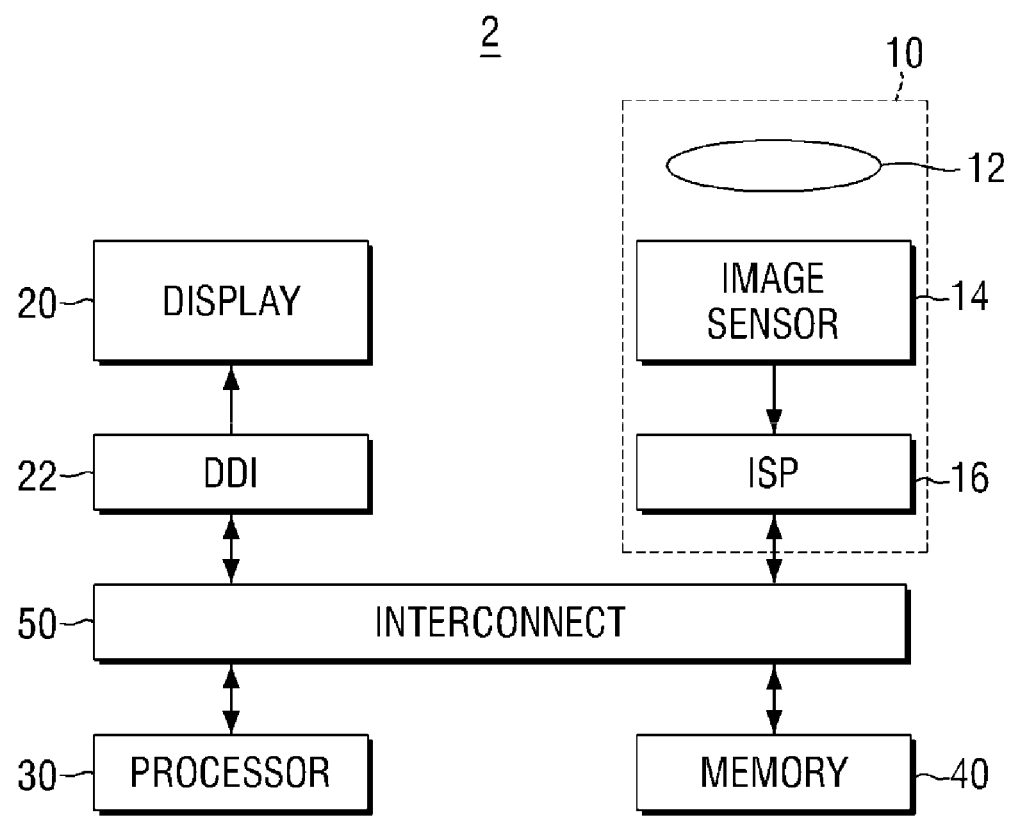
FIG. 3 is a schematic diagram of a mobile device according to an example embodiment.

FIG. 3 is a schematic diagram of a mobile device 2 according to example embodiments.

Referring to FIG. 3, the mobile device 2 according to example embodiments includes the camera 10, the display 20, a display driver integrated circuit (IC) (DDI) 22, a processor 30, and a memory 40.

The camera 10 includes a lens 12 receiving light from the subject 5 (or a scene or object), an image sensor 14 generating image data using a pixel array based on light that passes through the lens 12, and an image signal processor (ISP) 14 performing various digital processing operations (such as preprocessing and post-processing) on the image data obtained through the image sensor 14 and sending the image data to the display 20.

In example embodiments, the lens 12 may be a single lens, a dual lens, or a triple- or more lens. In example embodiments, if the lens 12 is a dual lens, a plurality of image sensors 14 respectively corresponding to the two lenses may be provided. In addition, in example embodiments, the image sensors 14 may include image sensors of the same type or image sensors of heterogeneous types.

In example embodiments, the image sensor 14 may be, but is not limited to, a charge coupled device (CCD) image sensor or a complementary metal-oxide-mobile (CMOS) image sensor.

The DDI 22 drives the display 20. The DDI 22 displays digital image data received from the camera 10 or digital image data received from another component of the mobile device 2 or an external source on the display 20 as, e.g., a red, green and blue (RGB) signal. In example embodiments, the DDI 22 may be implemented as, but is not limited to, a panel DDI or a mobile DDI.

The processor 30 executes instructions for controlling the operation of the camera 10 and the DDI 22 through an interconnect 50. In example embodiments, the processor 30 includes a central processing unit (CPU). However, the scope of example embodiments is not limited thereto, and the processor 30 may also include a graphic processing unit (GPU), a general purpose GPU (GPGPU), an application processor (AP), a digital signal processor (DSP), etc.

The memory 40 may store the instructions for controlling the operation of the camera 10 and the DDI 22 and store digital image data captured by the camera 10 or flash data serving as a flash light source. In example embodiments, the memory 40 may include a volatile memory such as a random access memory (RAM) or a nonvolatile memory such as a flash memory.

The camera 10, the display 20, the DDI 22, the processor 30 and the memory 40 may exchange data through the interconnect 50 such as a bus.

The mobile device 2 according to example embodiments may further include an input interface for receiving an input from a user or an application. The input interface may include one or more input devices, such as, for example, a touchscreen, physical hardware buttons, a camera, a microphone, and other input devices of the mobile device 2.

Figure 4:
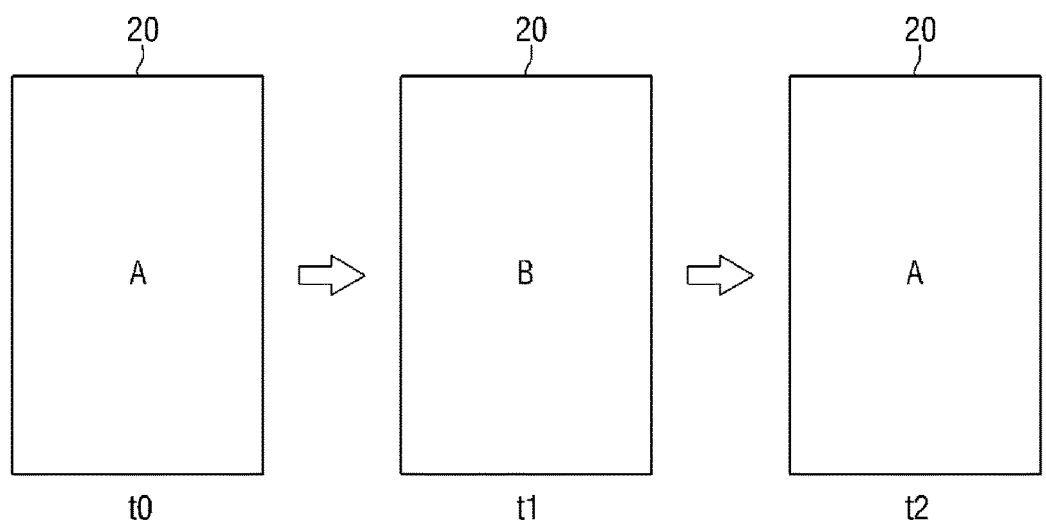
FIG. 4 is a schematic diagram illustrating operation of a mobile device, according to an example embodiment.
Figure 5:
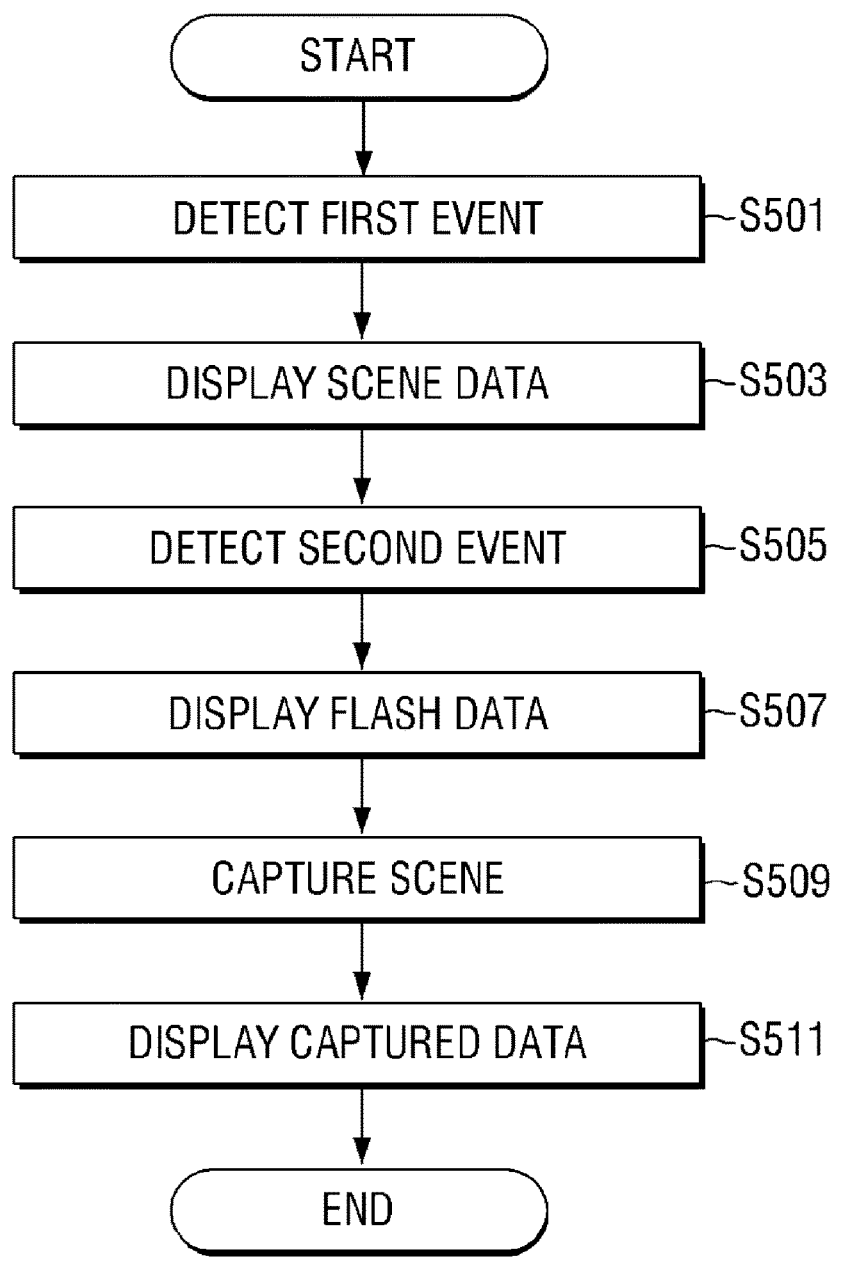
FIG. 5 is a flowchart illustrating operation of a mobile device, according to an example embodiment.

FIG. 4 is a schematic diagram illustrating operation of a mobile device, according to an example embodiment. FIG. 5 is a flowchart illustrating operation of a mobile device, according to an example embodiment.

Referring to FIGS. 4 and 5, the mobile device 2 may operate as follows according to example embodiments.

First, the mobile device 2 detects a first event (operation S501). Here, the first event indicates that an instruction for operating the camera 10 is executed. That is, the mobile device 2 can determine whether the camera 10 starts to operate based on the first event.

The first event may be generated in response to an image or video capture request from a user or an application. For example, when a user executes a camera application on the mobile device 2 to capture an image, the first event may be generated. In this case, the mobile device 2 may receive through the input interface the first event generated by the input from the user or the application.

In response to the first event, the mobile device 2 displays scene data generated by the image sensor 14 of the camera 10 on the display 20 (operation S503). Here, the scene data refers to image data of the subject 5 (or a scene) that is output in real time from the camera 10 after the camera 10 starts to operate. The user can determine a photographing structure or photographing timing while viewing the scene data displayed on the display 20.

Next, the mobile device 2 detects a second event (operation S505). Here, the second event indicates that an instruction for controlling the camera 10 to perform a photographing operation is executed. That is, the mobile device 2 can determine whether the camera 10 starts to perform the photographing operation based on the second event.

The second event may be generated in response to a shutter request from a user or an application. For example, when a user presses a shutter button to perform a photographing operation while viewing the scene data displayed on the display 20, the second event may be generated. In this case, the mobile device 2 may receive through the input interface the second event generated by the input from the user or the application.

In response to the second event, the mobile device 2 measures an external color temperature. The external color temperature is an absolute temperature representing the color of a light source illuminating the subject 5 (or the scene or object). A light source having a reddish color has a low color temperature, and a light source having a bluish color has a high color temperature. In the present specification, the light source having the reddish light source will be referred to as a warm color light source, and the light source having the bluish color will be referred to as a cool color light source. That is, the warm color light source has a low color temperature value, and the cool color light source has a high color temperature value.

In example embodiments, the measuring of the external color temperature may include measuring the external color temperature by analyzing the scene data generated using the image sensor 14 of the camera 10. The measuring of the external color temperature may also include measuring the external color temperature using a sensor 60 electrically connected to the camera 10. This will be described later with reference to FIGS. 10 and 11.

Next, the mobile device 2 measures the external color temperature of the light source illuminating the subject 5 (or the scene) to be captured and generates flash data having a color temperature for compensating for the external color temperature. Here, the flash data refers to image data displayed on the display 20 to use the display 20 as a flash light source. In example embodiments, when the measured external color temperature is warm, the color temperature of the generated flash data may be set to 'cool.' Conversely, when the measured external color temperature is cool, the color temperature of the generated flash data may be set to 'warm.'

In example embodiments, the color of the flash data may be set to various colors. The color of the flash data may be determined to be one among colors set before the first event is detected.

The mobile device 2 displays the generated flash data on the display 20 (operation S507) and captures the subject 5 (or the scene) using the camera 10 (operation S509). Then, the mobile device 2 displays the captured subject 5 (or scene) on the display 20 (operation S511), so that the user can view the captured subject 5 (or scene).

In example embodiments, referring to FIG. 4, the DDI 22 driving the display 20 may display the scene data and the flash data on the display 20 in a time division manner. The DDI 22 displays the scene data on the display 20 at a first time t0 before the detection of the second event and displays the flash data on the display 20 at a second time t1 after the detection of the second event.

In FIG. 4, 'A' indicates an area of the display 20 on which the scene data is displayed, and 'B' indicates an area of the display 20 on which the flash data is displayed. At a third time t2 after a photographing operation, the result of the photographing operation is displayed on the display 20.

That is, the DDI 22 displays the scene data on the display 20 at the first time t0 and then displays the flash data on the display 20 at the second time t1. Therefore, despite the absence of a flash light source, the DDI 22 can provide a flash light source to the mobile device 2 through the display 20. In addition, a flash light source having a color temperature adjusted, or flash light sources of various colors, can be generated.

Figure 6:
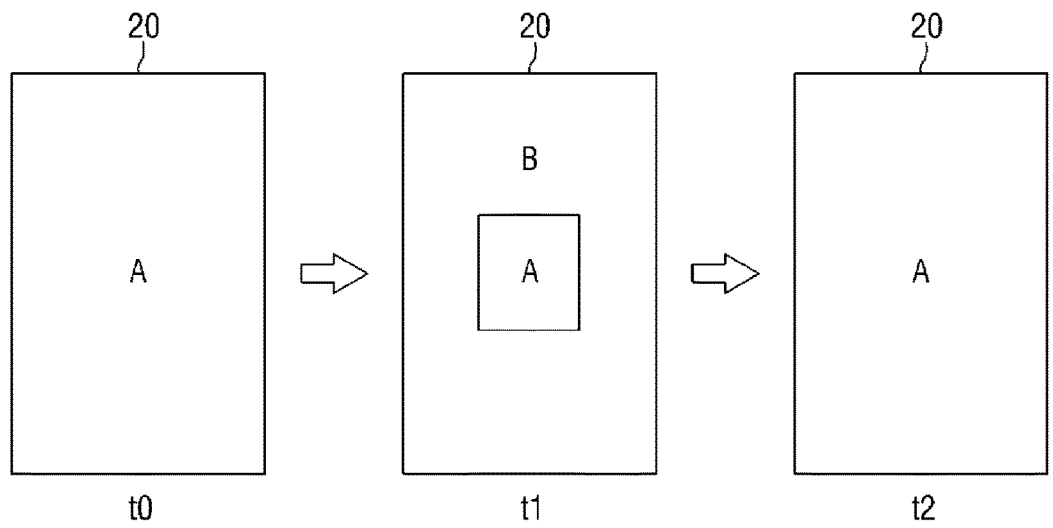
FIG. 6 is a schematic diagram illustrating operation of a mobile device, according to an example embodiment.
Figure 7:
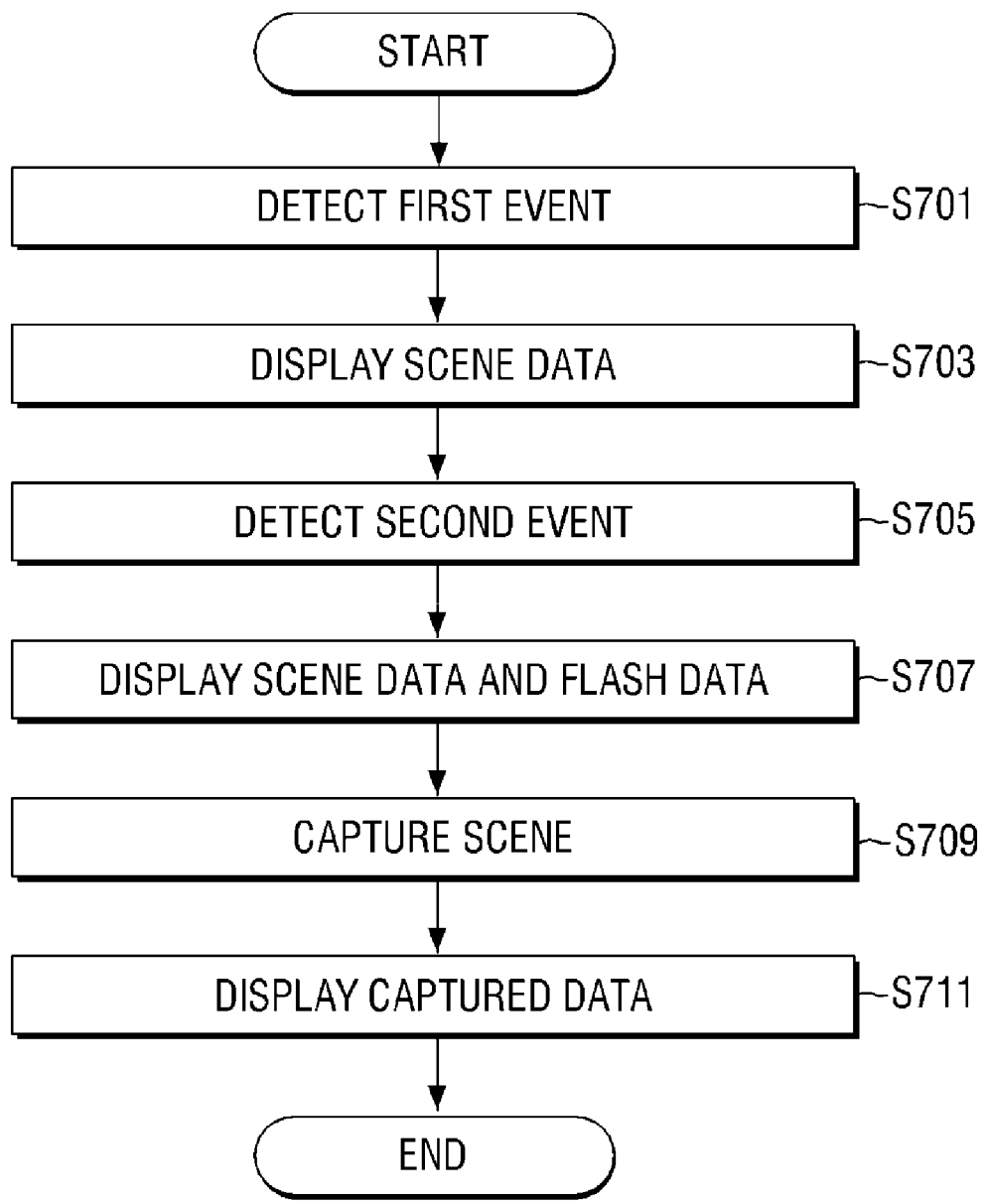
FIG. 7 is a flowchart illustrating operation of a mobile device, according to an example embodiment.

FIG. 6 is a schematic diagram illustrating operation of a mobile device, according to example embodiments. FIG. 7 is a flowchart illustrating operation of a mobile device, according to example embodiments.

Referring to FIGS. 6 and 7, the mobile device 2 may operate as follows according to example embodiments.

First, the mobile device 2 detects a first event (operation S701). Here, the first event indicates that an instruction for operating the camera 10 is executed. That is, the mobile device 2 can determine whether the camera 10 starts to operate based on the first event.

In response to the first event, the mobile device 2 displays, in real time, scene data generated by the image sensor 14 of the camera 10 on the display 20 (operation S703). Here, the scene data refers to image data of a subject 5 (or a scene) that is output in real time from the camera 10 after the camera 10 starts to operate. A user can determine a photographing structure or photographing timing while viewing the scene data displayed on the display 20.

Next, the mobile device 2 detects a second event (operation S705). Here, the second event indicates that an instruction for controlling the camera 10 to perform a photographing operation is executed. That is, the mobile device 2 can determine whether the camera 10 starts to perform the photographing operation based on the second event.

In response to the second event, the mobile device 2 generates flash data having a color temperature. Here, the flash data refers to image data displayed on the display 20 to use the display 20 as a flash light source. In example embodiments, as described above with reference to FIGS. 4 and 5, the mobile device 2 may measure an external color temperature of a light source illuminating the subject 5 (or the scene) to be captured and generate the flash data having a color temperature for compensating for the external color temperature. In addition, the mobile device 2 can set the color of the flash data to various colors.

Next, the mobile device 2 simultaneously displays the scene data and the generated flash data on the display 20 (operation S707). Then, the mobile device 2 captures the subject 5 (or the scene) using the camera 10 (operation S709). Finally, the mobile device 2 displays the captured subject 5 (or scene) on the display 20 (operation S711), so that the user can view the captured subject 5 (or scene).

In example embodiments, referring to FIG. 6, the DDI 22 driving the display 20 may display the scene data and the flash data on the display 20 in a spatial division manner. The DDI 22 may display the scene data on a first area A of the display 20 and the flash data on a second area B of the display 20. In other words, the DDI 22 may display the scene data on both the first area A and the second area B at a first time t0 before the detection of the second event and simultaneously displays the scene data and the flash data on the first area A and the second area B, respectively, at a second time t1 after the detection of the second event.

In FIG. 6, 'A' indicates an area of the display 20 on which the scene data is displayed, and 'B' indicates an area of the display 20 on which the flash data is displayed. At a third time t2 after a photographing operation, the result of the photographing operation is displayed on the display 20. Here, the DDI 22 may display the result of the photographing operation on both the first area A and the second area B.

That is, the DDI 22 displays the scene data on the display 20 at the first time t0 and then simultaneously displays the scene data and the flash data on the display 20 at the second time t1. Therefore, despite the absence of a flash light source, the DDI 22 can provide a flash light source to the mobile device 2 through the display 20. In addition, a flash light source having a color temperature adjusted, or flash light sources of various colors, can be generated.

Figure 8:
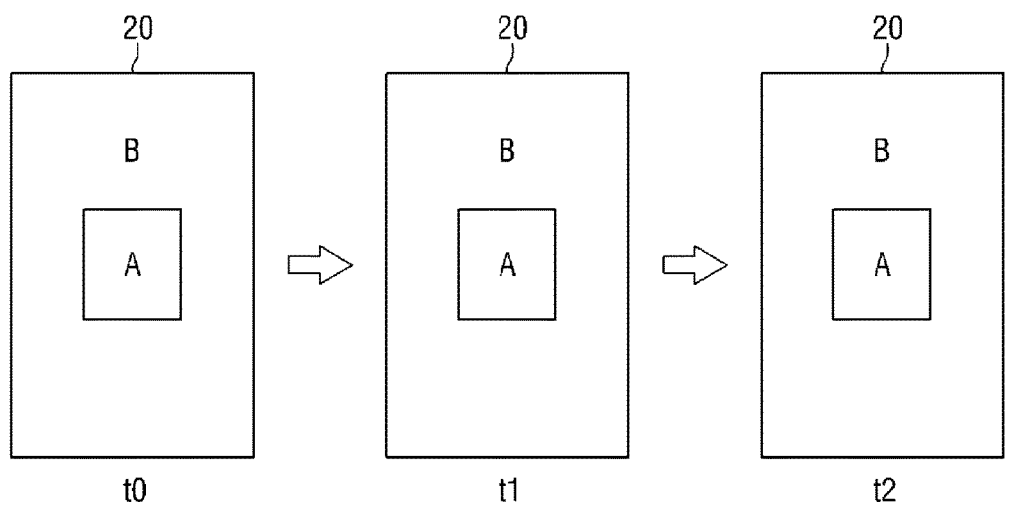
FIG. 8 is a schematic diagram illustrating operation of a mobile device, according to an example embodiment.
Figure 9:
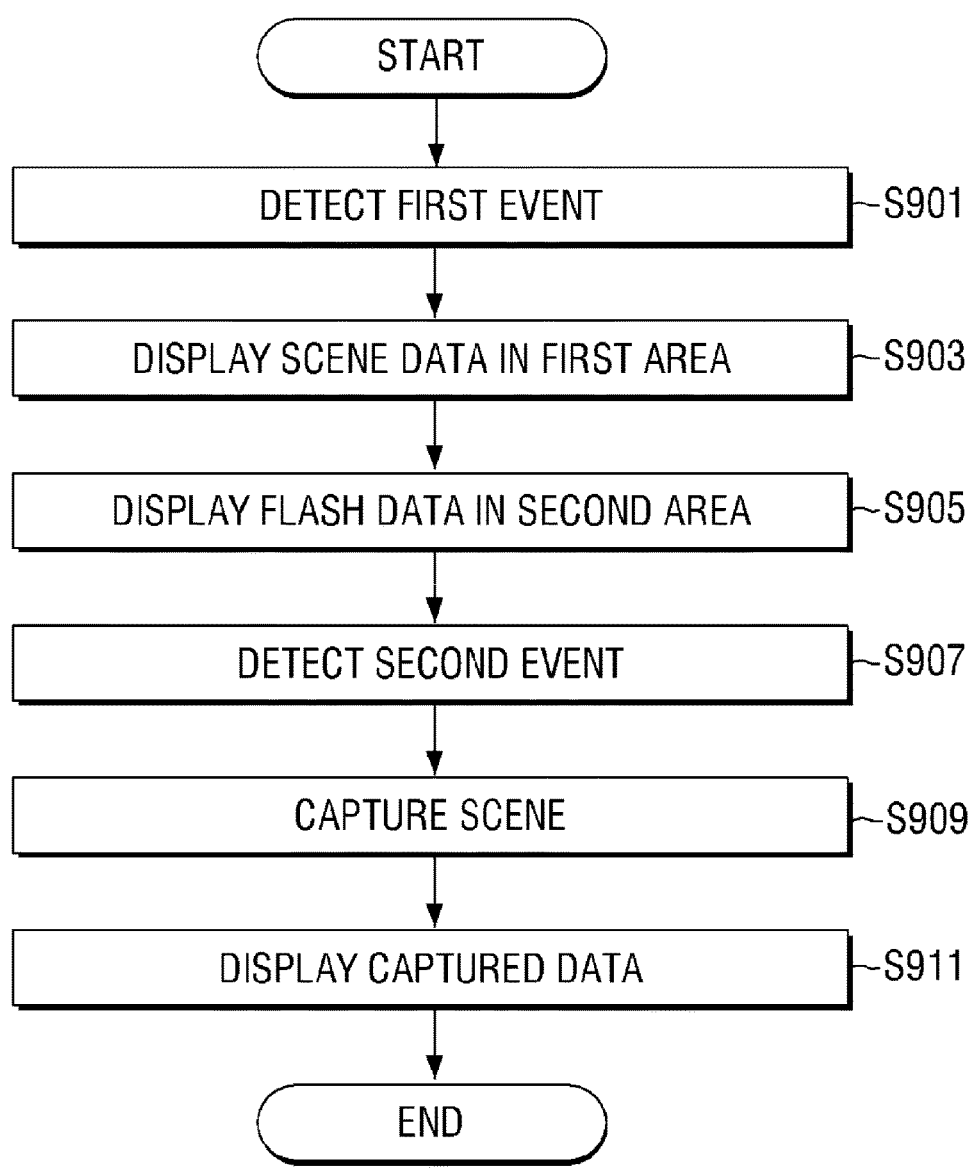
FIG. 9 is a flowchart illustrating an operation of a mobile device, according to an example embodiment.

FIG. 8 is a schematic diagram illustrating an operation of a mobile device, according to example embodiments. FIG. 9 is a flowchart illustrating an operation of a mobile device, according to example embodiments.

Referring to FIGS. 8 and 9, the mobile device 2 may operate as follows according to example embodiments.

First, the mobile device 2 detects a first event (operation S901). Here, the first event indicates that an instruction for operating the camera 10 is executed. That is, the mobile device 2 can determine whether the camera 10 starts to operate based on the first event.

In response to the first event, the mobile device 2 displays, in real time, scene data generated by the image sensor 14 of the camera 10 in a first area A of the display 20 (operation S903). Here, the scene data refers to image data of a subject 5 (or a scene) that is output in real time from the camera 10 after the camera 10 starts to operate. A user can determine a photographing structure or photographing timing while viewing the scene data displayed on the display 20.

Next, the mobile device 2 displays generated flash data in a second area B of the display 20 (operation S905)

Then, the mobile device 2 detects a second event (operation S907). Here, the second event indicates that an instruction for controlling the camera 10 to perform a photographing operation is executed. That is, the mobile device 2 can determine whether the camera 10 starts to perform the photographing operation based on the second event.

In response to the second event, the mobile device 2 captures the subject 5 (or the scene) using the camera 10 (operation S909). Then, the mobile device 2 displays the captured subject 5 (or scene) on the display 20 (operation S911), so that the user can view the captured subject 5 (or scene).

In example embodiments, referring to FIG. 8, the DDI 22 driving the display 20 may display the scene data and the flash data on the display 20 in a spatial division manner. The DDI 22 displays the scene data on the first area A of the display 20 at a first time t0 and a second time t1 and displays the flash data on the second area B of the display 20.

At a third time t2 after a photographing operation, the result of the photographing operation is displayed on the display 20. Here, the DDI 22 displays the result of the photographing operation only on the first area A and still display the flash data on the second area B. The above operation may be used when a video is captured using the camera 10 or when a video call is made using the camera 10.

That is, the DDI 22 displays the scene data on the first area A of the display 20 and the flash data on the second area B of the display 20. Therefore, despite the absence of a flash light source, the DDI 22 can provide a flash light source to the mobile device 2 through the display 20. In addition, a flash light source having a color temperature adjusted, or flash light sources of various colors, can be generated.

Figure 10:
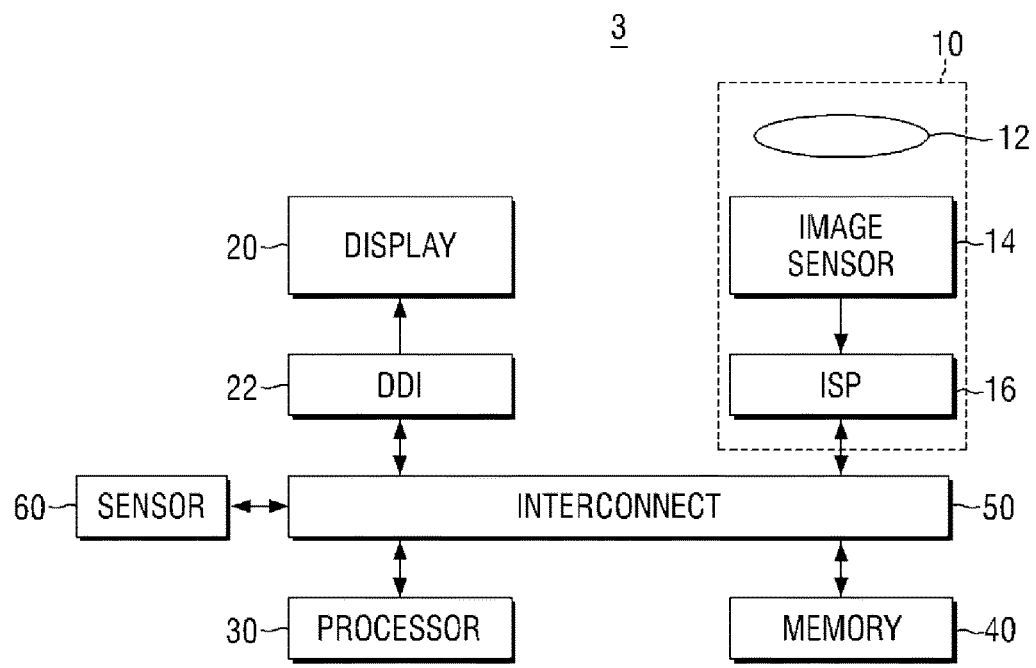
FIG. 10 is a schematic diagram of a mobile device according to an example embodiment.
Figure 11:
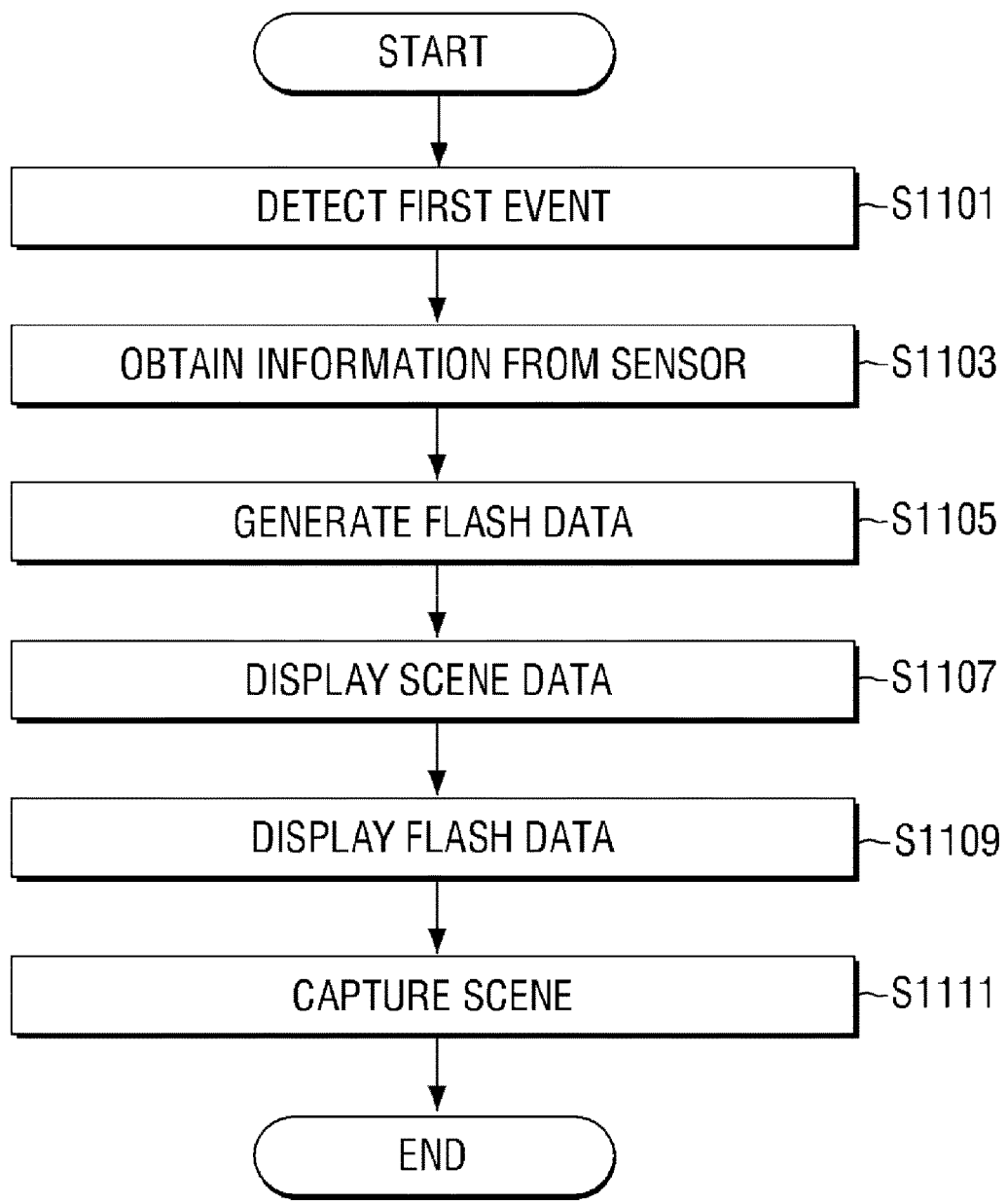
FIG. 11 is a flowchart illustrating operation of a mobile device, according to an example embodiment.

FIG. 10 is a schematic diagram of a mobile device 3 according to example embodiments. FIG. 11 is a flowchart illustrating an operation of a mobile device, according to example embodiments.

Referring to FIG. 10, the mobile device 3 according to example embodiments is different from the mobile device 2 of FIG. 3 in that the mobile device 3 further includes a sensor 60.

Measuring an external color temperature may include measuring the external color temperature by analyzing scene data generated using the image sensor 14 of the camera 10. The measuring of the external color temperature may also include measuring the external color temperature using the sensor 60 electrically connected to the camera 10. Here, the sensor 60 may be a light sensor.

The sensor 60 may exchange data with the camera 10, the display 20, the DDI 22, the processor 30 and the memory 40 through the interconnect 50.

Referring to FIG. 11, the mobile device 3 may operate as follows according to example embodiments.

First, the mobile device 3 detects a first event (operation S1101). Here, the first event indicates that an instruction for operating the camera 10 is executed. That is, the mobile device 3 can determine whether the camera 10 starts to operate based on the first event.

Next, the mobile device 3 receives or obtains color temperature information measured by the sensor 60 from the sensor 60 through an interface with the sensor 60 (operation S1103), and generates flash data having a color temperature for compensating for an external color temperature, based on the received color temperature information (operation S1105).

As in example embodiments described above with reference to FIGS. 4 through 9, the mobile device 3 displays scene data on the display 20 (operation S1107), displays the flash data on the display 20 (operation S1109), and captures a subject 5 (or a scene) using the camera 10 (operation S1111).

Figure 12:
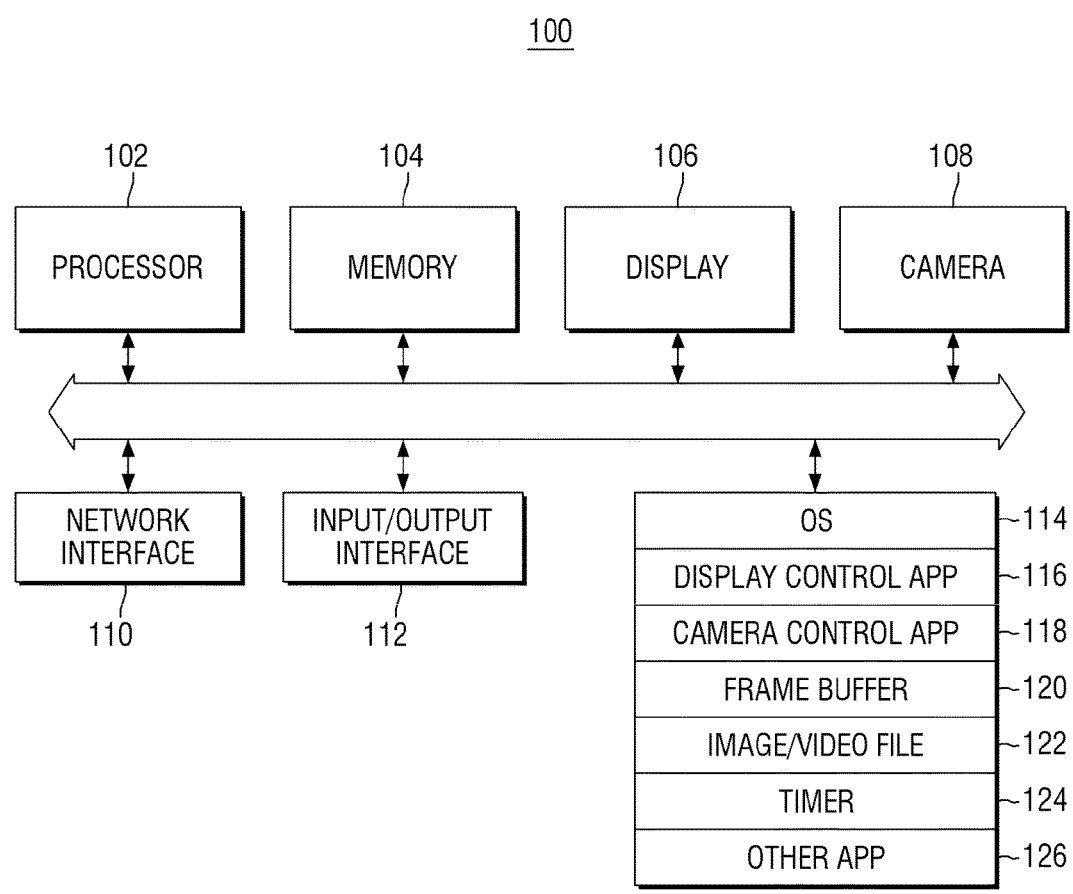
FIG. 12 is a schematic diagram of a mobile system according to an example embodiment.

FIG. 12 is a schematic diagram of a mobile system 100 according to example embodiments.

Referring to FIG. 12, the mobile system 100 according to example embodiments includes a processor 102, a memory 104, a display 106, a camera 108, a network interface 110, and an input/output interface 112. The input/output interface 112 may include one or more input/output devices, such as, for example, a touchscreen, physical hardware buttons, a camera, a microphone, a speaker, an LED, and other input/output devices of the mobile device 2.

The mobile system 100 according to example embodiments includes an operating system (OS) 114 that is executed by the processor to drive the mobile system 100, a display control application 116 controlling the display 106, a camera control application 118 controlling the camera 108, a frame buffer 120 storing scene data and flash data before the scene data and the flash data are displayed on the display 106, an image/video file 122 storing captured scenes, a timer 124 that is used by a DDI to control the scene data and the flash data, and other applications 126.

In addition, instructions for controlling the processor 102 to perform the above-described operations of a mobile device may be stored in a computer-readable recording medium and executed by the processor 102.

Figure 13:
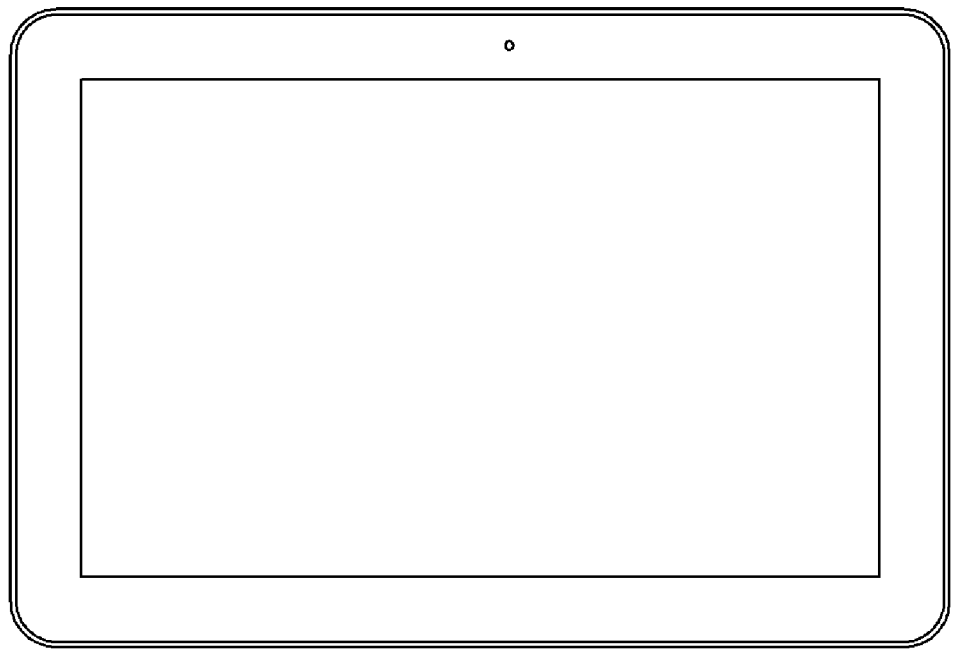
FIGS. 13 and 14 are schematic diagrams of a mobile system to which mobile devices or a mobile system according to example embodiments can be applied.
Figure 14:
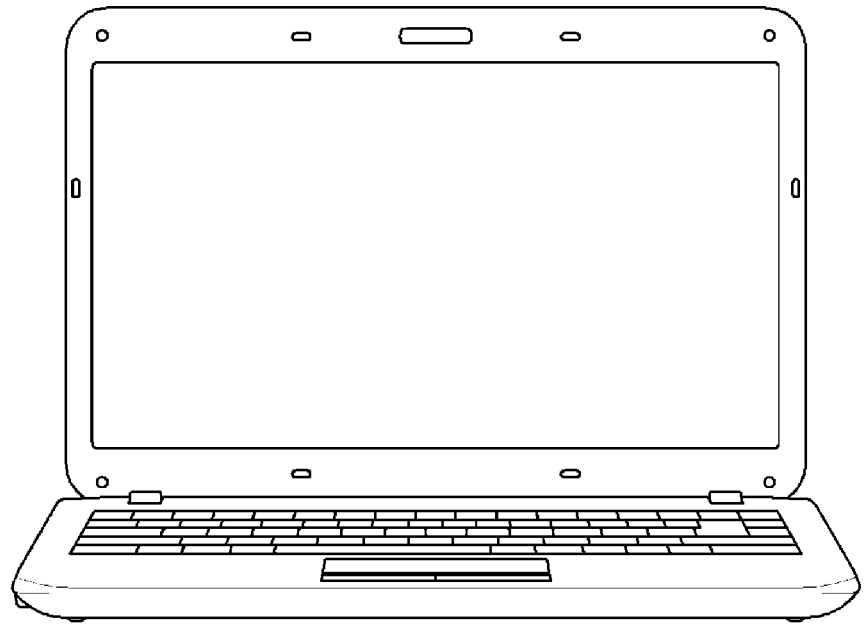

FIGS. 13 and 14 are schematic diagrams of a mobile system to which mobile devices or a mobile system according to example embodiments can be applied.

FIG. 13 illustrates a tablet personal computer (PC) 1200, and FIG. 14 illustrates a notebook computer 1300. The methods of operating a mobile device according to example embodiments or the mobile system, as set forth herein, may be used in the tablet PC 1200 and the notebook computer 1300.

It is obvious to those of ordinary skill in the art that the methods of operating a mobile device according to example embodiments or the mobile system, as set forth herein, may also be applied to various IC devices other than those set forth herein. That is, while the tablet PC 1200 and the notebook computer 1300 have been described above as examples of the mobile system according to example embodiments, the examples of the mobile system according to example embodiments are not limited to the tablet PC 1200 and the notebook computer 1300. In example embodiments, the mobile system may be provided as a computer, an Ultra Mobile PC (UMPC), a work station, a net-book computer, a PDA, a portable computer, a wireless phone, a mobile phone, an e-book, a portable multimedia player (PMP), a portable game console, a navigation device, a black box, a digital camera, a 3-dimensional television set, a digital audio recorder, a digital audio player, a digital picture recorder, a digital picture player, a digital video recorder, a digital video player, etc.

In addition, the example embodiments may also be implemented through computer-readable code and/or instructions on a medium, e.g., a computer-readable medium, to control at least one processing element to implement any above-described embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to example embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

At least one among the components, elements, modules or units represented by a block as illustrated in FIGS. 3, 10, and 12 may be embodied as various numbers of hardware, software and/or firmware structures that execute respective functions described above, according to the example embodiments. For example, at least one among these components, elements, modules or units may use a direct circuit structure, such as a memory, a processor, a logic circuit, a look-up table, etc. that may execute the respective functions through controls of one or more microprocessors or other control apparatuses. Also, at least one among these components, elements, modules or units may be embodied by a module, a program, or a part of code, which contains one or more executable instructions for performing specified logic functions, and executed by one or more microprocessors or other control apparatuses. Also, at least one among these components, elements, modules or units may further include or may be implemented by a processor such as a central processing unit (CPU) that performs the respective functions, a microprocessor, or the like. Two or more of these components, elements, modules or units may be combined into one single component, element, module or unit that performs all operations or functions of the combined two or more components, elements, modules or units. Also, at least part of functions of at least one among these components, elements, modules or units may be performed by another of these components, elements, modules or units. Further, communication between the components, elements, modules or units may be performed through the bus. Functional aspects of the above example embodiments may be implemented in algorithms that execute on one or more processors. Furthermore, the components, elements, modules or units represented by a block or processing steps may employ any number of related art techniques for electronics configuration, signal processing and/or control, data processing and the like.

Although a few embodiments have been shown and described, it would be appreciated by those skilled in the art that changes may be made in the example embodiments without departing from the principles and spirit of the disclosure, the scope of which is defined in the claims and their equivalents.

What is claimed is:

1. A method of operating a mobile device, the method comprising:
   detecting, through an interface of the mobile device, a first input for executing a camera application of the mobile device;
   displaying scene data that is generated by a camera of the mobile device, on a display of the mobile device, in response to the first input being detected;
   detecting, through the interface, a second input for requesting a shutter to perform a photographing operation of the camera application, while the scene data is displayed; and
   in response to the second input being while the scene data is displayed:
      measuring, by a light sensor different than the camera, an external color temperature external to the mobile device;
      generating flash data having a first color temperature for compensating the external color temperature that is measured;
      displaying the flash data that is generated, on the display; and
      capturing a scene, using the camera, while the flash data is displayed.

2. The method of claim 1, wherein the displaying the scene data and the displaying the flash data are performed in a time division manner.

3. The method of claim 1, wherein the displaying the scene data comprises displaying the scene data on the display at a first time before the detecting the second input, and
   the displaying the flash data comprises displaying the flash data on the display at a second time after the second input is detected.

4. The method of claim 1, further comprising, in response to the second input being detected while the scene data is displayed:
   analyzing the scene data that is generated; and
   measuring the external color temperature, based on the scene data that is analyzed.

5. The method of claim 1, wherein the generating comprises, in response to the external color temperature being measured to be warm, generating the flash data having the first color temperature that is cool.

6. The method of claim 1, wherein the generating comprises, in response to the external color temperature being measured to be cool, generating the flash data having the first color temperature that is warm.

7. The method of claim 1, wherein a color of the flash data is one among colors that are set before the detecting the first input.

8. The method of claim 1, wherein the first input and the second input are received through the interface.

9. The method of claim 8, wherein the scene data and the flash data are displayed on the display by a control application of the display at respective times at which the first input and the second input are respectively received.

10. A method of operating a mobile device, the method comprising:
   detecting, through an interface of the mobile device, a first input for executing a camera application of the mobile device;
   displaying scene data that is generated by a camera of the mobile device, on a display of the mobile device, in response to the first input being detected;
   detecting, through the interface, a second input for requesting a shutter to perform a photographing operation of the camera application, while the scene data is displayed; and
   in response to the second input being detected while the scene data is displayed:
      measuring, by a light sensor different than the camera, an external color temperature external to the mobile device;
      generating flash data having a first color temperature for compensating the external color temperature that is measured;
      displaying the scene data simultaneously with the flash data that is generated, on the display; and
      capturing a scene, using the camera, while the scene data is displayed simultaneously with the flash data.

11. The method of claim 10, wherein the displaying the scene data simultaneously with the flash data is performed in a spatial division manner.

12. The method of claim 10, wherein the displaying the scene data simultaneously with the flash data comprises displaying the scene data that is generated, on a first area of the display, while simultaneously displaying the flash data that is generated, on a second area of the display, the second area being different from the first area.

13. The method of claim 12, wherein the displaying the scene data comprises displaying the scene data on the first area and the second area of the display, before the detecting the second input.

14. A method of operating a mobile device, the method comprising:
   detecting, through an interface of the mobile device, a first input for executing a camera application of the mobile device;
   in response to the first input being detected, displaying scene data that is generated by a camera of the mobile device, on a first area of a display of the mobile device, while simultaneously displaying flash data different than the scene data, on a second area of the display, the second area being different from the first area;
   detecting, through the interface, a second input for requesting a shutter to perform a photographing operation of the camera application, while the scene data and the flash data are simultaneously displayed; and
   capturing a scene, using the camera, in response to the second input being detected while the scene data and the flash data are simultaneously displayed.

15. The method of claim 14, wherein the displaying the scene data and the displaying the flash data are performed in a spatial division manner.

16. The method of claim 14, further comprising displaying the scene that is captured, on the first area.

17. The method of claim 14, further comprising, in response to the first input being detected:
   measuring an external color temperature external to the mobile device; and
   generating the flash data having a first color temperature for compensating the external color temperature that is measured.

* * * * *